Nov. 25, 1941.   R. O. WOOD   2,263,792
MOLDED ARTICLE AND METHOD OF PRODUCING SAME
Filed July 28, 1936

INVENTOR
ROBERT O. WOOD

Patented Nov. 25, 1941

2,263,792

UNITED STATES PATENT OFFICE 2,263,792

MOLDED ARTICLE AND METHOD OF PRODUCING SAME

Robert O. Wood, Rochester, N. Y., assignor to Button Corporation of America, Newark, N. J., a corporation of New Jersey Application July 28, 1936, Serial No. 93,031

12 Claims. (Cl. 18—59)

My invention relates to articles molded by heat and pressure from plastic materials and the methods of producing such molded articles. Particularly my invention relates to such molded articles presenting a pearly or nacreous appearance.

One of the objects of my invention is to produce nacreous or nacreous-like molded articles which will be non-inflammable and unaffected by washing, boiling in water, damp atmosphere, dry cleaning solvents or pressing with a hot iron.

Another object is to provide a method for producing molded articles of the character set forth above.

A further object is to provide a method for producing such molded articles, which will be adaptable to common molding practice and which will be economical of both labor and materials.

Still another object is to produce a molded article of the character described above the nacreous-like surfaces of which have the high polish and uniformity of the mold surfaces, rather than the irregularities and other imperfections of surfaces which are produced by lacquering.

Other objects, features and advantages of the invention will be set forth in the detailed description thereof which follows or will become apparent therefrom.

Those familiar with the art of plastics will recognize that at the present time the materials used to produce pearl effects, such as guanine, mercury chloride and crystalline salts of bismuth, tin, lead and the like, are almost invariably carried in cellulose thermoplastics, usually pyroxylin. Only such carrying materials as may be maintained for a considerable period of time in a plastic condition are suitable to undergo the "working" which is required properly to orient the pearl-like particles.

Attempts to introduce pearl-like materials into thermo-setting resins have never produced the pearl effects obtainable in cellulose plastics. The principal cause of failure is the inability to obtain proper orientation of the pearl-like particles. A secondary cause is the marked chemical action of thermo-setting resins towards both metallic salts and organic pearl-like materials at ordinary molding temperatures.

As a result of the above factors and because of the high cost of satisfactory pearl or pearl-like substances, it is found that with very few exceptions the imitation pearl articles on the market are either coated with a lacquer containing a pearl or pearl-like substance or consist of bodies to which have been cemented thin sheets of the expensive material consisting of cellulose plastic having incorporated and carefully and properly orientated therein suitable pearl-like particles. Surfaces coated with such lacquer have pearly lustre but lack the configuration necessary to suggest natural pearl. By the term natural pearl I wish to be understood to mean pearl shell or mother-of-pearl. Strictly speaking there are no articles of molded imitation pearl. Fountain pen barrels are machined from a solid block of the aforesaid cellulose plastic in which the orientation of the pearl-like particles has been carefully established. If this same material were subjected to the flux of plastic molding, the configuration would be destroyed, the orientation of the pearl-like particles disturbed and a smeared effect would result.

Attempts to cement thin sheets of cellulose plastic containing orientated pearl-like particles to molded thermo-setting plastics such as urea-formaldehyde have met with failure due to poor adhesion. Nevertheless a permanent combination of a heat resistant and inert base with a properly simulated nacreous surface coating or layer has great potential utility in commerce for such articles as household electric switch panels, knife handles, knobs, buttons for clothing and many others.

I have endeavored to show why at the present state of the art, molded imitation pearl articles are not available and that even if it were technically possible to produce the same the cost of such articles carrying pearl-like materials solidly through the body of the article, would be excessively expensive.

I will now set forth the advantages which result from my new method of producing molded articles exhibiting a nacreous surface appearance.

A. By my process there is required but one application of heat and pressure in an ordinary hydraulically operated molding die.

B. The body of the article, which body may amount to as much as 99 percent or more of the finished piece by weight, is composed of a relatively inexpensive material.

C. The body of the piece, being composed of a thermo-setting resin, is permanently hardened by the molding heat and will thereafter furnish a permanent heat resistant non-deformable backing for the film carrying the pearl-like material.

D. Covering a base by molding and welding the base and a nacreous-like film simultaneously rather than by the use of an imitation pearl lacquer is advantageous for the reason that films may be cast horizontally and the configuration may be easily controlled and permanently established. This is not possible to accomplish by dipping, spraying or brushing.

E. The use of a precast nacreous-like or imitation pearl film has a further advantage over lacquering in that the said film passes through the molding operation and thereby its surface is brought to a state of polish and symmetry only limited by the finish of the mold. Lacquering after molding, on the other hand, would be subject to such surface defects as are inherent in all lacquers.

A point which I particularly wish to stress is that in accordance with my invention the nacreous-like or imitation pearl surface film is not in any sense cemented to the thermo-setting base or body. No adhesive is used. The union with the thermo-setting body is purely mechanical and results from the provision of thermoplastic extensions for the nacreous-like film and the penetration of such extensions into the thermosetting body. Adhesion on the contrary implies simply a molecular attraction. The length, thickness, and spacing of the thermoplastic extensions can be controlled as desired. These extensions or roots, so to speak, are planted in the thermo-setting molding material before it has taken its final shape and before it has been subjected to the molding operation. In the finished article these extensions still exist, but in reduced size, as minute tendrils permanently embedded in and in clinching relation with the now finally hardened and infusible thermo-setting resinous base. The thermo-setting base and its thermoplastic surface coating are thus firmly bonded together; but the bonding means is purely mechanical, both in form and action, for the same consists of a multiplicity of anchorings having physical reality and comprising the aforesaid thermoplastic extensions or tendrils which are disposed in pores of the base and the coacting gripping wall portions of said pores. The molding operation is performed at such pressure and heat that the thermo-setting resinous base will be effectively cured and converted to its finally hardened infusible state. During this molding operation the base material is appreciably compacted and the aforesaid penetrating thermoplastic extensions of its surface coating are thereby squeezed thinner and into gripping or clinching engagement therewith. Also during such molding operation, which is carried out at a temperature sufficiently high to soften the aforesaid thermoplastic penetrating extensions, the outer ends of said extensions are fused or welded to the pearl-like film. The said thermoplastic extensions and the carrier mass of the pearl-like film are preferably composed of the same material, except, as will presently appear, the outer surface portion of said film contains little or none of the hereinafter described plasticizer.

To facilitate the description of my invention reference will be made to the accompanying drawing in which I have illustrated diagrammatically the principal steps involved in the preferred manner of carrying out my process.

I will now describe in detail one method of carrying out my invention.

Figure 1:
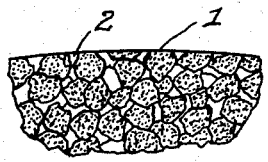
Fig. 1 is a magnified fragmental cross section of the surface part of a standard preform of thermo-setting plastic molding powder.

Preforms of a suitable thermo-setting plastic material are first made in a standard pilling or preforming machine in accordance with standard practice. I prefer to use as a thermo-setting plastic material ordinary powdered urea-formaldehyde molding material such as is commercially available. The final molding under heat and pressure, of a preform made of such material, would produce a white slightly translucent finished article. The preforms should each weigh about 5% in excess of the weight of the finished molding to be produced. In Fig. 1 is shown a section of such a preform greatly magnified. The preform comprises resinous particles 1 and voids 2. The preforms are made by compression only. No heat is used. Sufficient pressure is used to secure a moderately hard coherent pill which may be handled without particular care, but which at the same time presents a minutely porous surface. These pills are white and opaque.

In shape the preform may vary widely, but preferably it should roughly approximate the shape of the finished piece. The preform may be made with ridges, corrugations or grooves if desired.

Having now a supply of uniform preforms I impregnate and coat them with a suitable thermoplastic molding material. Suitably plasticized cellulose derivatives in general are transparent and have the nearest approach to water whiteness of any of the thermoplastics having desirable physical properties. I have found suitably plasticized cellulose acetate satisfactory as cellulose acetate is stable to light and heat and is inert toward urea-formaldehyde and toward pearl and pearl-like materials. I am aware of other cellulose derivatives and other thermoplastics which may be similarly used, but prefer plasticized cellulose acetate of the ordinary molding type.

In this connection it may be well to state that although cellulose acetate is commonly considered as a plastic, it is a fact well known to those skilled in the art that cellulose acetate in its pure state has only slight plasticity even at high temperatures, and is not subject to autogenous welding even under great pressure and elevated temperature. The cellulose acetate molding plastics of commerce are usually solid solutions made by combining cellulose acetate with one or more plasticizers. The plasticizer is ordinarily present in amount equal to 25 or 30% of the weight of the cellulose acetate. Many materials have been offered as plasticizers that are little more than internal lubricants or softeners. These are of doubtful utility for my purpose. For use in my invention I prefer a true or solvent plasticizer which has an actual solvent effect on cellulose acetate. When such a true or solvent plasticizer is used with cellulose acetate a compound results which has remarkable plasticity and which easily welds to itself under heat and slight pressure.

The plasticizer which I prefer for its solvent power, stability and lack of color and disagreeable odor is dimethyl phthalate. I do not wish to be limited to dimethyl phthalate as I am aware that there are many other plasticizers that singly or in combination can be used to carry out my method.

To impregnate and preliminarily coat the preforms I prefer a solution containing cellulose acetate and dimethyl phthalate, one part each by weight in 20 to 40 parts by weight of acetone. I prefer acetone as a solvent because of the low viscosity of its solution of the cellulose acetate and plasticizer, and because it has no solvent effect on the urea-formaldehyde preform. It is also extremely rapid drying. It will be noted that the proportion of plasticizer to cellulose acetate is unusually high for cellulose acetate plastic materials. The function of this excess will appear subsequently.

Figure 2:
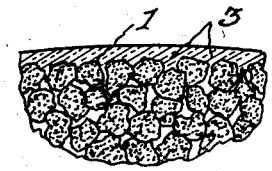
Fig. 2 shows a similar cross section of a preform after impregnation with a thermoplastic.

To uniformly coat or impregnate the preforms, they may be brushed, sprayed, dipped, tumbled or otherwise handled as may be best suitable to the shape and weight of the preforms. Small light preforms may be sprayed while tumbling in a mushroom tumbler, or they may be dipped in a basket which is later revolved to remove the excess solution by centrifugal force. By proper control of the solution density and denseness of the preforms, the latter may be dipped in such a manner that no excess solution remains on the surface, but is absorbed almost immediately into the body of the preform. In all cases the cellulose acetate should penetrate the preform and a comparatively uniform layer should remain on the surface. The depth of penetration and the thickness of the surface film may be varied to meet the requirements of the particular case. Preforms that must undergo greater surface distortion will require greater impregnation and thicker surface coatings. After the preforms are impregnated they are air dried until the acetone has completely disappeared. Slight artificial heat may be used if desired. After drying the preforms are ready for the molding operation. Fig. 2 shows a section of an impregnated and coated preform greatly magnified. The particles of thermo-setting resin 1, are now covered and interpenetrated by the thermoplastic 3.

The next step of the process involves the preparation and use of the nacreous-like sheets. For best results in the production of such sheets I prefer to use guanine, commonly known as "fish scale," although there are other materials such as mercury chloride which may be used. Although for some purposes skived sheets might be used to advantage I generally prefer cast sheets which may be made on a continuous film machine as thin as .001 of an inch. Small sheets may be easily cast on horizontal plate glass in a well known manner. For casting such sheets I prefer to use a solution of cellulose acetate in acetone in which solution is suspended the guanine. One part by weight of cellulose acetate is dissolved in ten to twenty parts of acetone and enough of the guanine, fish scale, or pearl essence added to produce the effect desired in a sheet of the thickness required. This solution or dope is spread uniformly on the glass plates and allowed to dry. It is preferable in these sheets to use no plasticizer; for reasons which will subsequently appear. If necessary, a few percent may be used to prevent curling, or if it is desirable to draw or shape the sheet for use in a deep mold. After partially drying, various patterns may be produced in the film by combing lightly with a comb of metal or other suitable material. Dopes of low viscosity will produce during drying, without combing, a pattern similar to alligator skin. Other patterns or configurations are produced by disturbance of the normal orientation of the pearl-like particles. When imitation pearl sheets are made by casting, advantage is taken of the fact that desirable orientation of the pearl-like particles takes place automatically in cast films. When the films are thoroughly free from all solvent they are trimmed to suitable size or may be curved or preformed by heat and slight pressure as desired.

Figure 5:
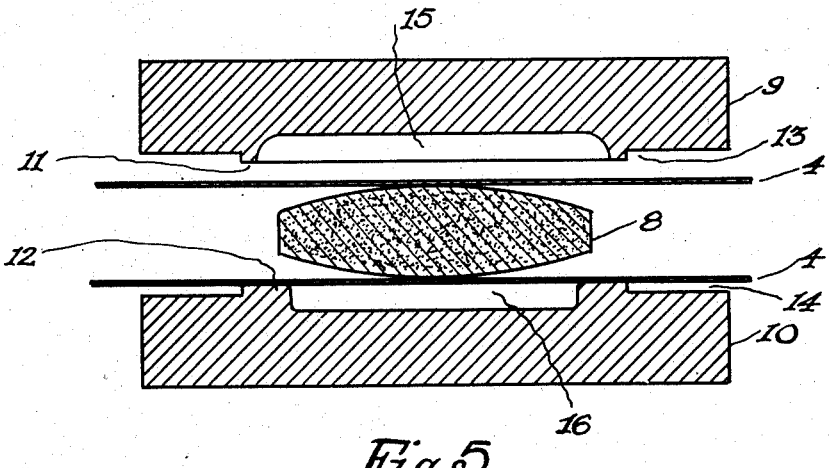
Fig. 5 shows a cross section of a plastic mold with impregnated thermo-setting plastic preform and pearl-like sheets in position for molding.

Having now a supply of prepared preforms and imitation pearl sheets I may proceed to mold the finished articles. My process may be used with single cavity molds, but it is particularly adaptable to multiple molds having a multiplicity of cavities. In the latter case one of the imitation pearl sheets may be trimmed to such a size that it will cover the whole face of the die, thus avoiding the necessity of locating a separate small sheet for each cavity. After the said trimmed sheet is placed on the face of the die, the preforms are dropped on the sheet in such a manner as to be located directly over the die cavities respectively. This may be accomplished by the use of a loading plate in the usual way. Another method is to previously provide properly spaced depressions in the imitation pearl sheet; in which depressions are placed the preforms. The imitation pearl sheet may thus become a loading plate. After the preforms and imitation pearl sheet are positioned on the lower half of the die, a second imitation pearl sheet, if desired, may be laid on top of the preforms. Heat is now applied and the die closed under pressure. In Fig. 5 is shown a single cavity die having upper half 9 and lower half 10 ready to close on preform 8, and imitation pearl sheets 4. As the die closes the preform 8 undergoes compression and forces the sheets 4, into the upper cavity 15 and the lower cavity 16 respectively. Under the influence of heat and progressive pressure the preform shapes itself to the mold, and its prepared surfaces weld autogenously to the imitation pearl sheets. With a properly adjusted cycle with respect to temperature, rate of closing and duration, it will be found that there is relatively little flow along the surface of the die, and that the faces of the preform undergo very little extension. The excess material is forced from the interior of the preform horizontally, and issues between the sheets 4 and between the upper cut off 11 and the land 12 into the flash spaces 13 and 14. The thermosetting body is thus totally covered by a closely welded imitation pearl film which is exactly shaped to the interior of the mold.

It may be recalled that the impregnating thermoplastic preferably contained an excess of plasticizer, whereas the imitation pearl sheets preferably contained none or a mimimum of the same. The reason for this becomes apparent when the functions of the said sheets and the impregnating plastic are respectively considered. It is of course desirable to have the outer layer of the article as hard and resistant to wear and as resistant to heat as is possible in using cellulose acetate. This is realized by keeping the plasticizer in the imitation pearl sheets at a minimum. Nevertheless there must be plasticizer available to make autogenous welding possible. For this reason, excess plasticizer is incorporated in the impregnating plastic. Under the influence of heat some of the excess plasticizer volatilises and permeates the interior surface portions of the imitation pearl sheets enough to bring about the welding. In the molding operation, however, the outer surface portions of said sheets are not permeated to an appreciable degree by the plasticizer originally incorporated in the impregnating material 3. Therefore the exterior surface portions of the finished molded articles will have the hardness, heat resistance and other desirable physical properties of unplasticized cellulose acetate.

Figure 3:
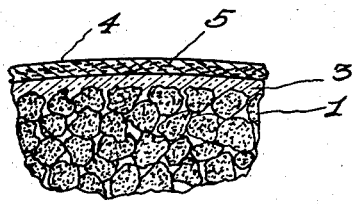
Fig. 3 shows a similar cross section of an impregnated preform with juxtapositioned pearl-like film an instant before welding takes place.

Fig. 3 shows an assembly of an imitation pearl sheet 4 with oriented pearl-like particles 5, and an impregnated preform, just before the simultaneous molding and welding operations.

Figure 4:
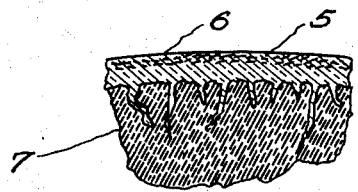
Fig. 4 is a magnified fragmental cross section of the surface part of a finished molding.

Fig. 4 is a fragmental sectional view of the finished molded piece showing a surface portion thereof. The oriented pearl-like particles 5 lie, for the most part, in the aforesaid hard and heat resistant exterior surface portion of the outer layer 6 that is produced by the autogenous welding of the impregnating thermoplastic coating 3 and the sheet 4 in the molding operation, as has already been described. In such molding operation the thermo-setting resinous preform is cured to a permanently hardened infusible body 7.

Having thus described my invention, what I claim and desire to secure by Letters Patent is:

1. A molded article having a molded surface and comprising a base or body of thermo-setting resinous material in its finally cured infusible state and an outer generally thermoplastic layer secured together in clinching relation, the inner portion of said layer being more thermoplastic than the outer surface portion thereof and having a multiplicity of extensions penetrating the contiguous portion of said base, such penetration having been effected prior to the molding operation and with said base portion in a thermoplastic and comparatively porous condition.

2. A molded article having a molded surface and comprising a hard infusible base or body of thermo-setting resinous material and a surface layer mechanically secured together in clinching relationship by mutual interpenetration, the inner and outer portions of said layer being fused or welded together and the said outer portion being but slightly thermoplastic as compared to said inner portion, the said body and layer having interpenetrating contiguous portions, such interpenetration having been effected prior to the molding operation and with the resinous material of the said contiguous portion of the body in a thermoplastic and comparatively porous condition.

3. A molded article having a molded surface and comprising a base or body of finally hardened infusible thermo-setting resinous material and a generally thermoplastic surface layer mechanically locked together by mutual interpenetration of adjacent portions thereof, such interpenetration having been effected prior to the molding operation and with said resinous material in a thermoplastic condition, the inner portion of said layer being more thermoplastic than the outer surface portion thereof.

4. A molded article having a molded surface and comprising a hard infusible body of thermo-setting resinous material and a generally thermoplastic coating firmly secured together by mutual interpenetration of their contiguous portions, such interpenetration having been effected prior to the molding operation and with said resinous material in a thermoplastic and comparatively porous condition, said coating increasing in thermoplasticity from the surface portion thereof inwardly, said surface portion having comminuted material of nacreous appearance dispersed therein.

5. A molded article having a molded surface and comprising a body of hardened infusible thermo-setting resinous material and a generally thermoplastic surface layer mechanically secured together by mutual interpenetration of their contiguous portions, such interpenetration having been effected prior to the molding operation and with said resinous material in a thermoplastic condition, the inner portion of said layer being of substantially greater thermo-plasticity than the outer surface portion thereof, said outer surface portion having nacreous-like particles dispersed and oriented therein.

6. A molded article having a molded surface and comprising a hard infusible body of thermo-setting resinous material and a generally thermoplastic coating secured together by mutual interpenetration of their contiguous portions, such interpenetration having been effected prior to the molding operation and with said resinous material in a thermoplastic condition, said coating comprising a cellulose derivative as its basic material and a solvent plasticizer for such basic material, the inner portion of said coating containing a predominating proportion of said plasticized and the outer surface portion of said coating having nacreous-like particles dispersed therein.

7. A molded article having a molded surface and comprising a hard infusible body of thermo-setting resinous material and a generally thermoplastic coating secured together by mutual interpenetration of their contiguous portions, such interpenetration having been effected prior to the molding operation and with said resinous material in a thermoplastic condition, said coating comprising cellulose acetate as its basic material and a solvent plasticizer for such basic material, the inner portion of said coating containing a predominating proportion of said plasticizer and the outer surface portion of said coating having nacreous-like particles dispersed therein.

8. The process which comprises forming a coherent body of uncured comminuted thermo-setting resinous material, impregnating and coating said body with a thermoplastic material, superimposing on the impregnated body a coherent layer of a material which is of slight thermoplasticity as compared to said impregnating and coating material, and then molding said impregnated body with the said superimposed layer under heat and pressure to thereby simultaneously effect the molding of said layer, the molding and curing of said body and the welding together of the impregnated body and the superimposed layer.

9. The process which comprises forming a coherent porous body of uncured thermo-setting resinous material; impregnating and coating said body with a material comprising a mixture of a substance which of itself, is substantially non-thermoplastic and of a solvent plasticizer for such substance; forming a sheet of said substantially non-thermoplastic substance with nacreous-like particles dispersed and oriented therein; superimposing said sheet on the impregnated and coated body; and then subjecting said body and superimposed sheet to heat and pressure in a mold to thereby simultaneously effect the molding of said sheet, the molding and curing of said body and the welding together of said body and sheet.

10. A molded article comprising a body of thermo-setting resinous material in its final hardened infusible state and a generally thermoplastic coating layer firmly bonded in clinching relationship by mutual interpenetration of their contiguous portions, such interpenetration having been effected prior to the molding operation and with said resinous material in a thermoplastic condition.

11. The process which comprises the steps of forming a coherent somewhat porous body of uncured comminuted thermo-setting resinous material, applying to said body a generally thermoplastic layer with contiguous portions of such layer and body in mutually interpenetrating relationship, and thereafter molding said body and applied layer under heat and pressure to thereby effect relative displacement of the interpenetrating portions of said body and layer into firm gripping relationship and also the curing of said body.

12. The process which comprises the steps of superimposing a mass of uncured comminuted thermo-setting resinous material and a layer of generally thermoplastic material one on the other with contiguous portions thereof in mutually interpenetrating relationship, and thereafter subjecting the superimposed mass and layer to a molding operation under heat and pressure to thereby effect relative displacement of the interpenetrating portions therof into firm gripping relationship and also the curing of said resinous material.

ROBERT O. WOOD.